US012780401B2

(12) United States Patent
Monterzino et al.

(10) Patent No.: US 12,780,401 B2
(45) Date of Patent: Nov. 3, 2026

(54) ELECTRIC PROPULSION SYSTEMS

(71) Applicant: GREENJETS LIMITED, Hertfordshire (GB)

(72) Inventors: Guido Monterzino, Cambridgeshire (GB); Arava Anmol Manohar, Buckinghamshire (GB)

( * ) Notice: Subject to any disclaimer, the term of this patent is extended or adjusted under 35 U.S.C. 154(b) by 0 days.

(21) Appl. No.: 18/856,535

(22) PCT Filed: Apr. 13, 2023

(86) PCT No.: PCT/GB2023/051001

§ 371 (c)(1),
(2) Date: Oct. 11, 2024

(87) PCT Pub. No.: WO2023/199071

PCT Pub. Date: Oct. 19, 2023

(65) Prior Publication Data

US 2025/0263174 A1 Aug. 21, 2025

(30) Foreign Application Priority Data

Apr. 13, 2022 (GB) ..................................... 2205503

(51) Int. Cl.
*B64C 11/00* (2006.01)
*B64D 27/34* (2024.01)
(Continued)

(52) U.S. Cl.
CPC ............ *B64C 11/001* (2013.01); *B64D 27/34* (2024.01); *B64D 27/35* (2024.01); *B64D 27/355* (2024.01);
(Continued)

(58) Field of Classification Search
CPC ...... B64D 27/34; B64D 27/355; B64D 27/24; B64D 27/357; B64D 33/08; B64C 11/001
See application file for complete search history.

(56) References Cited

U.S. PATENT DOCUMENTS 7,712,701 B1 * 5/2010 Ehrmantraut .......... B64U 50/19
244/17.23
9,303,589 B2 * 4/2016 Heikurinen ........... F01D 5/3061
(Continued)

FOREIGN PATENT DOCUMENTS

FR 3094955 A1 10/2020
GB 2594706 A1 11/2021
WO WO-2021220001 A1 * 11/2021 ............. B64D 27/33

OTHER PUBLICATIONS

International Search Report for PCT/GB2023/051001 mailed Jun. 30, 2023.
Written Opinion for PCT/GB2023/051001 mailed Jun. 30, 2023.

*Primary Examiner* — Justin Michael Heston
(74) *Attorney, Agent, or Firm* — Baker, Donelson, Bearman, Caldwell, & Berkowitz, PC

(57) ABSTRACT

Examples provide electric propulsion systems; such a system comprising: a. a nacelle comprising an aerodynamic annular housing defining an internal annular volume and defining an inner duct, b. at least one fan stage comprising a fan bearing a plurality of aerodynamic surfaces/blades to generate thrust mounted within a fan shroud, and c. a powertrain comprising at least one electric motor to drive the fan shroud and at least one electrical power source to power the electric motor; and d, wherein i. the fan shroud is disposed within the inner duct, ii. at least part of the powertrain is disposed within the internal annular volume, iii. the at least one electric motor is disposed within the central hub and iv. the hub-to-tip ratio is between 0.1 and 0.4, preferably, between 0.2 and 0.3.

26 Claims, 9 Drawing Sheets

(51) Int. Cl.

| | |
|---|---|
| ***B64D 27/35*** | (2024.01) |
| ***B64D 27/355*** | (2024.01) |
| ***B64D 27/357*** | (2024.01) |
| ***B64D 29/00*** | (2006.01) |
| ***B64D 33/08*** | (2006.01) |

(52) U.S. Cl.
CPC ........... *B64D 27/357* (2024.01); *B64D 29/00* (2013.01); *B64D 33/08* (2013.01)

(56) References Cited

U.S. PATENT DOCUMENTS

| | | | | |
|---|---|---|---|---|
| 10,138,899 | B2 | 11/2018 | Joubert et al. | |
| 11,292,604 | B2 * | 4/2022 | Thomassin | B64D 27/357 |
| 2020/0198792 | A1 * | 6/2020 | Joshi | F02K 5/00 |
| 2021/0131355 | A1 * | 5/2021 | Szarvasy | F02C 6/20 |
| 2021/0394915 | A1 * | 12/2021 | Carlson | H02J 7/34 |

* cited by examiner

100

200

300

400

500

600

800

900

ELECTRIC PROPULSION SYSTEMS

This application is a National Stage Entry of PCT Application No. PCT/GB2023/051001, filed on Apr. 13, 2023, which is an International Application that claims priority from GB 2205503.2 filed on Apr. 13, 2022, the contents of each of which are incorporated herein by reference in their entireties.

BACKGROUND

There is an increasing drive to reduce carbon emissions to combat global warming. Part of that drive involves improving the efficiency of existing gas turbine engines and internal combustion engines of, for example, aircraft. Alternative propulsion technologies are also being investigated such as, for example, electric propulsion systems. Ground vehicles that use electric motors are well-established. However, aircraft that use electric motors to drive aerodynamic surfaces are less well established and face a number of technical challenges such as the relatively low energy density of electrical energy sources, lower power densities of batteries and inherent inefficiencies such as thermal management systems, power losses and other inefficiencies.

BRIEF INTRODUCTION OF THE DRAWINGS

Examples will be described with reference to the accompanying drawings in which

DETAILED DESCRIPTION

Figure 1:
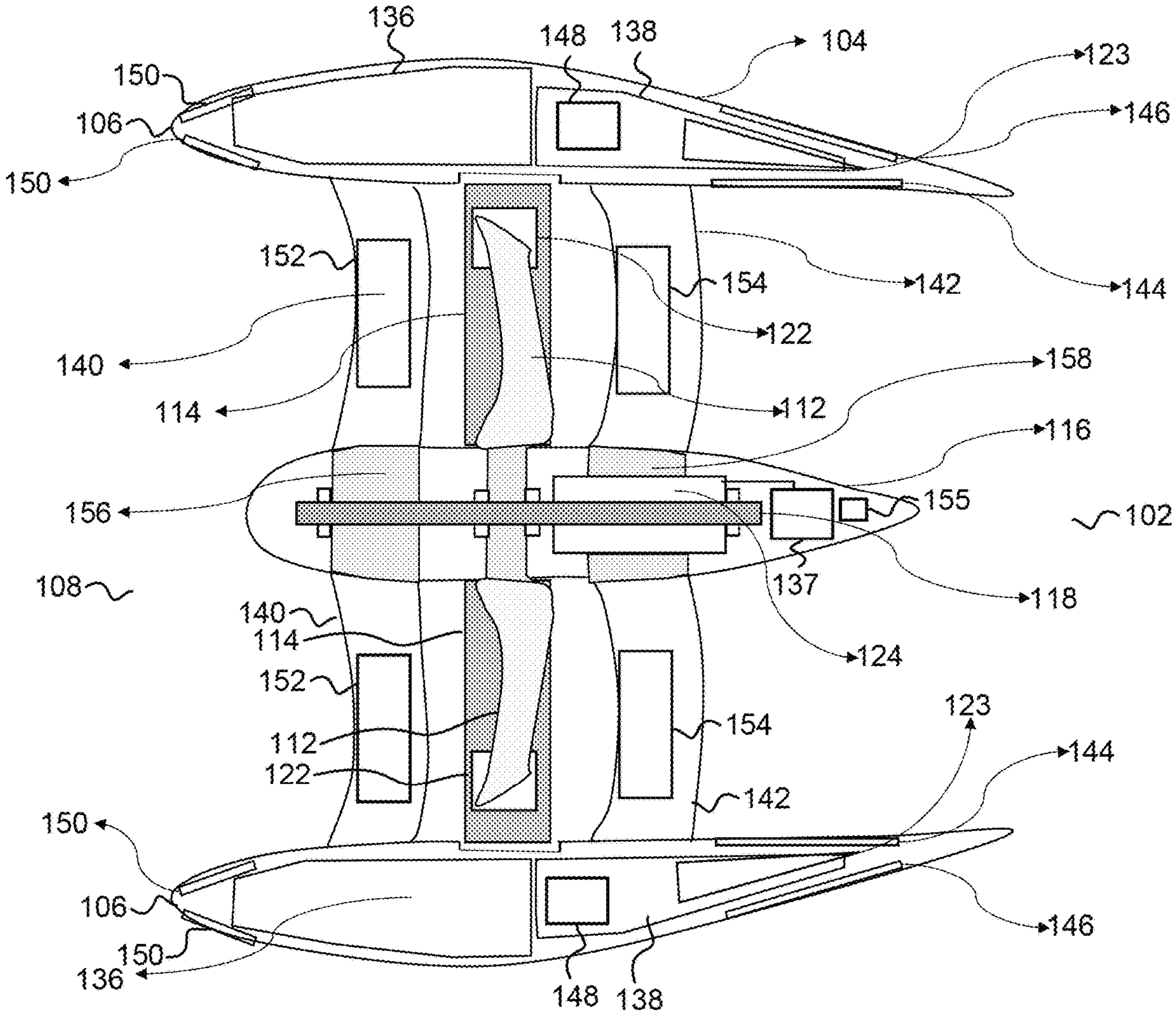
FIG. 1 shows an electric propulsion system according to a first example.

Referring to FIG. 1 there is shown a view 100 of an electric propulsion system 102. The electric propulsion system can be for an aircraft. The electric propulsion system 102 comprises a nacelle 104. The nacelle 104 comprises an aerodynamic annular housing. The annular housing defines an internal annular volume 106. The annular housing also defines an inner duct indicated generally as 108. The inner duct is external to the housing and forms an airflow path through which air passes. The electric propulsion system 102 comprises at least one fan stage 110. The fan stage has a plurality of aerodynamic surfaces or blades 112 for generating thrust. The blades 112 are mounted to an annular fan shroud 114. The fan shroud 114 is mounted on a central hub 116 so that the fan comprising the blades 112 can rotate about a central shaft 118. Each of the blades 112 is mounted to the fan shroud 114 via a respective fixture 122. Using a fan shroud can reduce noise generation that is otherwise associated with open tip blades. The noise reduction can be realised, at least in part, using sound absorbing materials to form the nacelle housing. Further noise reductions can be realised by profiling a profiled trailing edge geometry to the nacelle 104. The profiled trailing edge bears features such as, for example, a Helmholtz Resonator muffler 123, that reduce aero-electric noise associated with operating the propulsion system 102. The Helmholtz Resonator muffler 123 is arranged to suppress large amplitude and mid to low frequency pressure fluctuations such as, for example, mechanical vibratory noise of aerodynamic bodies immersed in a propulsive medium and buffeting noise arising at an engine intake.

The electric propulsion system 102 comprises a powertrain having at least one electric motor to drive the fan stage 110 via the fan shroud 114. Other than the electric motor, the powertrain is, at least partly, housed within the inner annular volume 106. Housed within the inner annular volume 106 is at least one electrical power source to power the at least one electric motor. In the example illustrated, a single electric motor 124 is provided. A electric motor 124 comprises a set of stator coils (not shown) that are arranged to cooperate with a set of rotor magnets (not shown). The fan shroud is driven by the electric motor 124 . . . . The nacelle 104, as well as producing thrust, acts as structural housing for the powertrain. The nacelle 104 also functions as a safety shroud that protects the vehicle against blade failure.

The internal volume 106 of the nacelle 104 houses part of the powertrain for driving the fan stage 110. Examples can be realised in which the powertrain comprises at least one or more than one of: at least one electric motor, at least one electrical power source to power the at least one electric motor, an engine control unit, at least one inverter, a power distribution system, a thermal management system, a fuel cell, taken jointly and severally in any and all permutations. While the electric motor 124 is housed in the central hub 116, other parts of the powertrain are housed within the interior annual volume 106 defined by the nacelle 104.

In the example depicted, the powertrain comprises at least one electrical power source 136. The at least one electrical power source 136 can comprise an energy storage system. The energy storage system can comprise at least one battery. The at least one electrical power source 136 is housed within the internal volume 106 of the nacelle 104. The at least one electrical power source 136 is arranged to supply power to one or more inverters 137 for driving the electric motor 124. Alternatively, the one or more inverters 137 can be housed within the interior volume 106 of the nacelle 104 with the drive signals being coupled to the electric motor 124 via cabling.

The nacelle 104 comprises a further internal volume 138. The further internal volume 138 is arranged to accommodate system, a fire protection system, a de-icing system, taken jointly and severally in any and all permutations.

The central hub 116 is coupled to the nacelle 104 via a number of load transfer members. Examples can be realised in which the number of load transfer members comprises a set of fore, or inlet, guide vanes 140. Examples can be realised additionally, or alternatively, in which the load transfer members comprise a set of aft, or exit, guide vanes 142, which are described below with reference to figures. The load transfer members are arranged to transfer thrust generated by the blades 112 to the rest of the electric propulsion system 102 and, ultimately, to a vehicle bearing such a propulsion system. The exit guide vanes can be used as control surfaces to enable the thrust to be vectored, which can be used to manoeuvre an associated vehicle such as an aircraft.

The aft portion of the nacelle 104 comprises at least one heat exchanger. In the example shown the aft portion of the nacelle 104 comprises sets of heat exchangers. A first set of heat exchangers 144 is disposed on an inward facing surface of the nacelle housing. The first set of heat exchangers 144 is arranged to couple heat from the powertrain to the air contained within the inner duct 104. Coupling heat from the powertrain to the air within the inner duct 108 causes that air to expand and, therefore, to contribute to generating thrust. The aft portion of the nacelle comprises a further set of heat exchangers 146. The further set of heat exchangers 146 is arranged to couple heat from the powertrain and vent it to atmosphere in order to manage the thermal conditions within the powertrain.

Any and all examples can be realised in which the heat exchangers 144 have surface features that suppress noise associated any boundary layer of the downstream flow within the inner duct. The surface features can comprise undulations on the inwardly directed surfaces of the heater exchangers 114. Examples can be realised in which the undulations present a ribbed texture surface or airflow interface. The undulations can comprise microscale structures, such as, for example, dentils, arranged to create longitudinal grooves. The size and pitch of these grooves is a function of an expected local velocity and density of the medium flowing through the nacelle. Any or each of the examples described herein can be realised comprising such microstructures in the range of 100 to 300 μm in depth and 30 to 40 μm in width. Examples presenting such a textured or profiled surface realise boundary layer noise attenuation as well as local skin friction reduction. Examples can be realised in which such attenuation follows without incurring a specific heat exchange penalty.

A thermal management system 148 is provided to manage the thermal conditions associated with the powertrain. A common thermal management system is used to manage the thermal conditions associated with each element, or at least with selectable elements, of the powertrain. The thermal management system 148 uses liquid coolant, such as, for example, a dielectric fluid to transfer heat away from any such elements of the powertrain and to direct that heat to at least one, or both, of the first 144 and second 146 sets of heat exchangers. Having a common thermal management system 148 supports collecting or harvesting heat from one or more than one component of the electric propulsion system, in particular, the powertrain such as, for example, one or more than one of: any motor or motors, any battery or batteries, any power electronics such as any inverter or inverters taken jointly and severally in any and all permutations, which saves weight and complexity.

The thermal management system 148 can also direct heat generated by the powertrain to a set of heaters, or to at least one set of heaters. For example, the thermal management system 148 can direct heat generated by the powertrain to de-icing heaters 150 associated with the leading edge of a fore section of the nacelle 104. The de-icing heaters 150 are arranged to de-ice the nacelle. Examples can also be realised in which the thermal management system 148 can couple heat to at least one, or both, of the load transfer members 140 and/or 142, or the blades 112. The thermal management system 148 can couple heat from the powertrain to heaters or heat exchangers 152 and/or 154 in the inlet 140 and exit 142 guide vanes. Furthermore, the thermal management system 148 can couple heat from the powertrain to the central hub 116 via a respective heater or respective heat exchanger 155.

An effective way of realising lightweight motors for a given power is to increase the revolutions per minute and to reduce the torque since electric motors are sized according to torque. To introduce electric redundancy into the electric propulsion system 102, examples can be realised in the electric motor 124 is capable of spinning at a high RPM, that is, that are capable of spinning above a threshold level RPM. Examples can be realised in which the threshold level RPM would be a speed above 2,000 RPM and below 60,000 RPM. Examples can be realised in which the motors are arranged to generate fan speeds of between 2,000 and 3,000 RPM. It can be appreciated that electric motor 124 is used to drive the central shaft 118 carrying the fan shroud 114. Aerodynamic efficiency is realised by ensuring that the single fan stage 110 operates at RPMs of above 2000.

As indicated above the interior volume 106 of the nacelle 104 can comprise a powertrain having a fuel cell, that is, can comprise a fuel cell powertrain. Several advantages follow from including a fuel cell powertrain in the interior of the nacelle 104. For example, electrical cabling within an aircraft needed by the propulsion system can be reduced thereby leaving space for hydrogen storage and distribution systems. Furthermore plug and play propulsion, that is, electricity generation to thrust generation in a propulsor, supports quick replacement of the powertrain that, in turn, can reduce aircraft downtime for operators.

It can be appreciated that the load transfer members 140 and 142 are coupled to respective structures 156 and 158 for transferring load from the rotor fan stage 114 to the inlet guide vanes 140 and exit guide vanes 142. The respective structures can comprises a central hub or boss 156, 158.

It will be appreciated that the motor, inverter and battery share at least one of: power management, thermal management, structural housing, and protection equipment, taken jointly and severally in any and all permutations, thereby leading to weight and efficiency gains. Furthermore, as the motors are direct drive, the rotational speeds are relatively low. Normally low rotational speeds require a high torque and heavy electric motor because, in traditional systems, the motor has to have a large radius.

Figure 2:
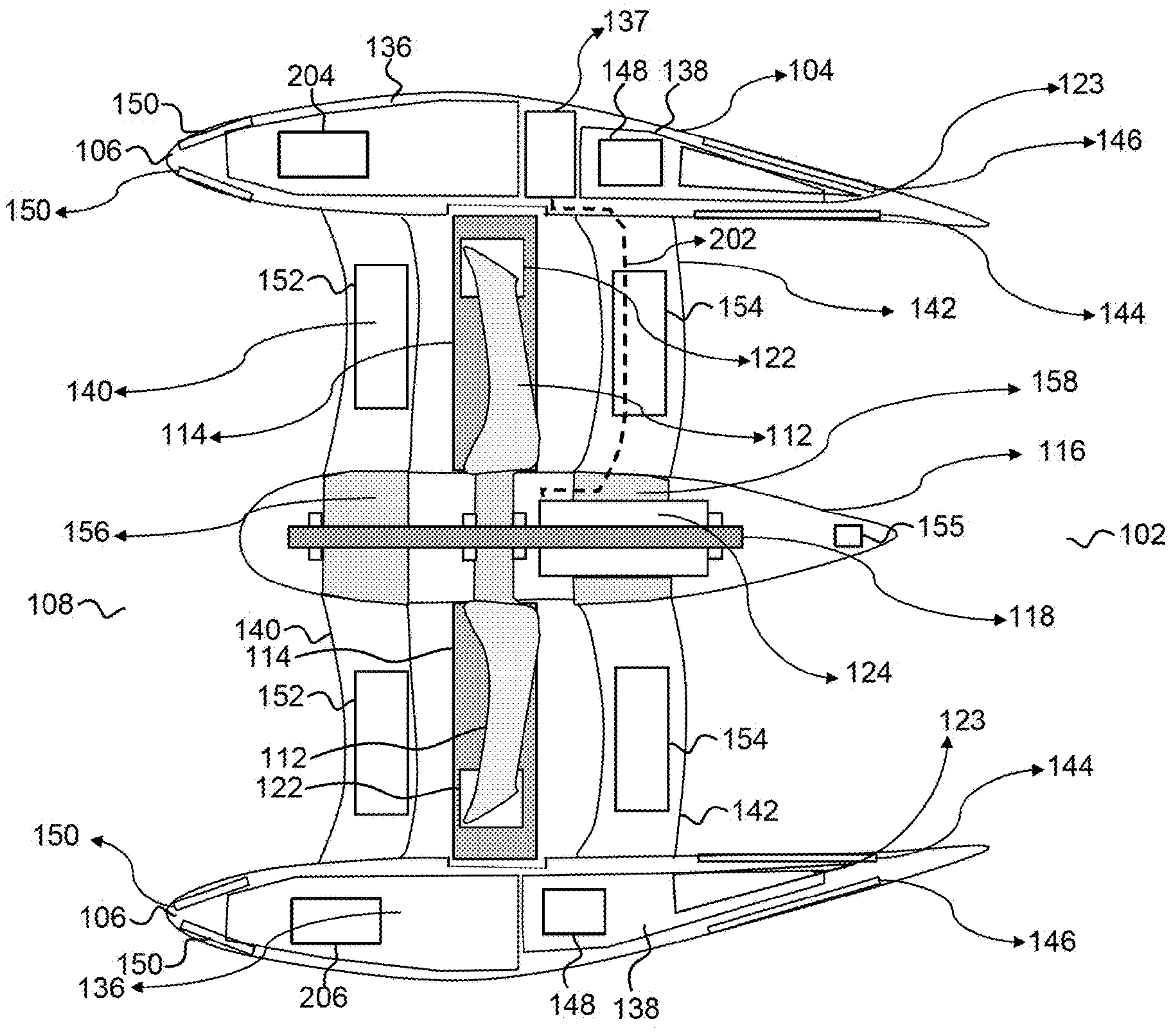
FIG. 2 illustrates an electric propulsion system according to a second example.

Referring to FIG. 2, there is shown a view 200 of an example of the electric propulsion system 102.

Reference numerals common to FIGS. 1 and 2 refer to the same elements.

The electric propulsion system 102 houses the inverter 137 within interior volume 106 of the nacelle 104. Accordingly, cabling 202 is provided to couple the drive signals output by the inverter 137 to the electric motor 124.

The example of the electric propulsion system 102 depicted in FIG. 2 can also comprise one or more than one fuel cell. In the example depicted, two fuel cells 204 and 206 are illustrated. Although the example shown illustrates two fuel cells 204 and 206, examples are not limited to such an arrangement. Examples can be realised in which multiple fuel cells are positioned within the annular space 106 defined by the nacelle housing 104. Examples can be realised in which a single fuel cell is provided that has an annular shape. Alternatively, or additionally, the one or more than one fuel cell 204 and 206 can comprise annular segments circumferentially disposed within the interior annular space defined by the nacelle 104.

There are several advantages to including a fuel cell in the inner volume 106 of the nacelle 104 such as, for example, increasing payload volume in the aircraft. Furthermore, all electrical cabling in the aircraft needed by the propulsion system can be reduced since the distance between the fuel cell and any electric motors is reduced, which leaves space within the aircraft for fuel storage for the fuel to power the fuel cell such as hydrogen storage and hydrogen distribution systems.

Figure 3:
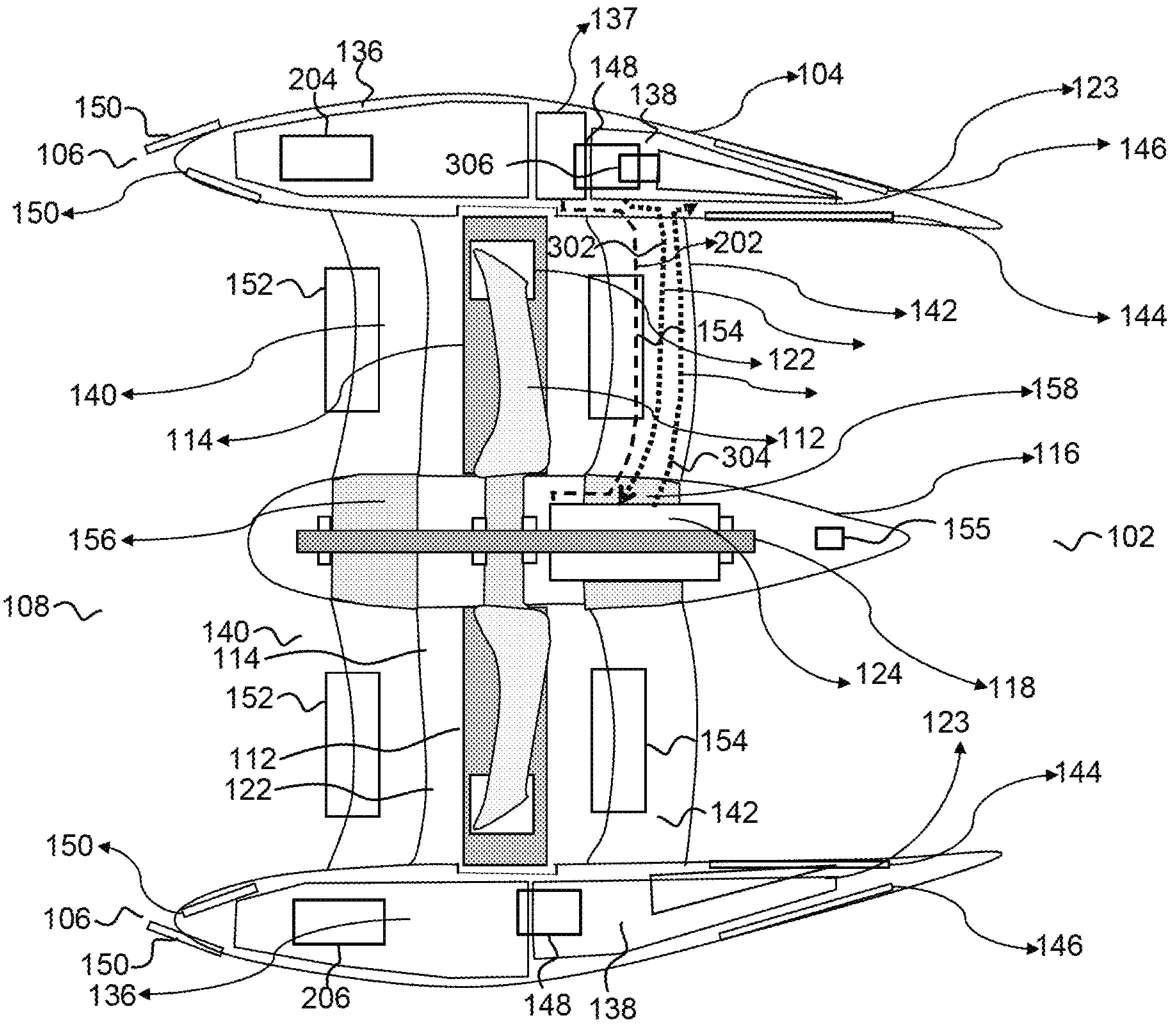
FIG. 3 depicts an electric propulsion system according to a third example.

Referring to FIG. 3, there is shown a view 300 of an electric propulsion system 102 according to an example. Reference numerals common to FIG. 3 and any preceding figure refer to the same elements.

The thermal management system 148 comprises flow 302 and return 304 pipes for carrying a coolant from a coolant reservoir 306 to the electric motor 124. Examples can be realised in which the coolant is a dielectric coolant. The coolant is arranged to carry heat away from the electric motor 124. Additionally, in examples in which the inverter 137 is also in the central hub 116, the coolant can carry heat away from the inverter 137. The heater can be directed to any of the heat exchangers and/or heaters.

Figure 4:
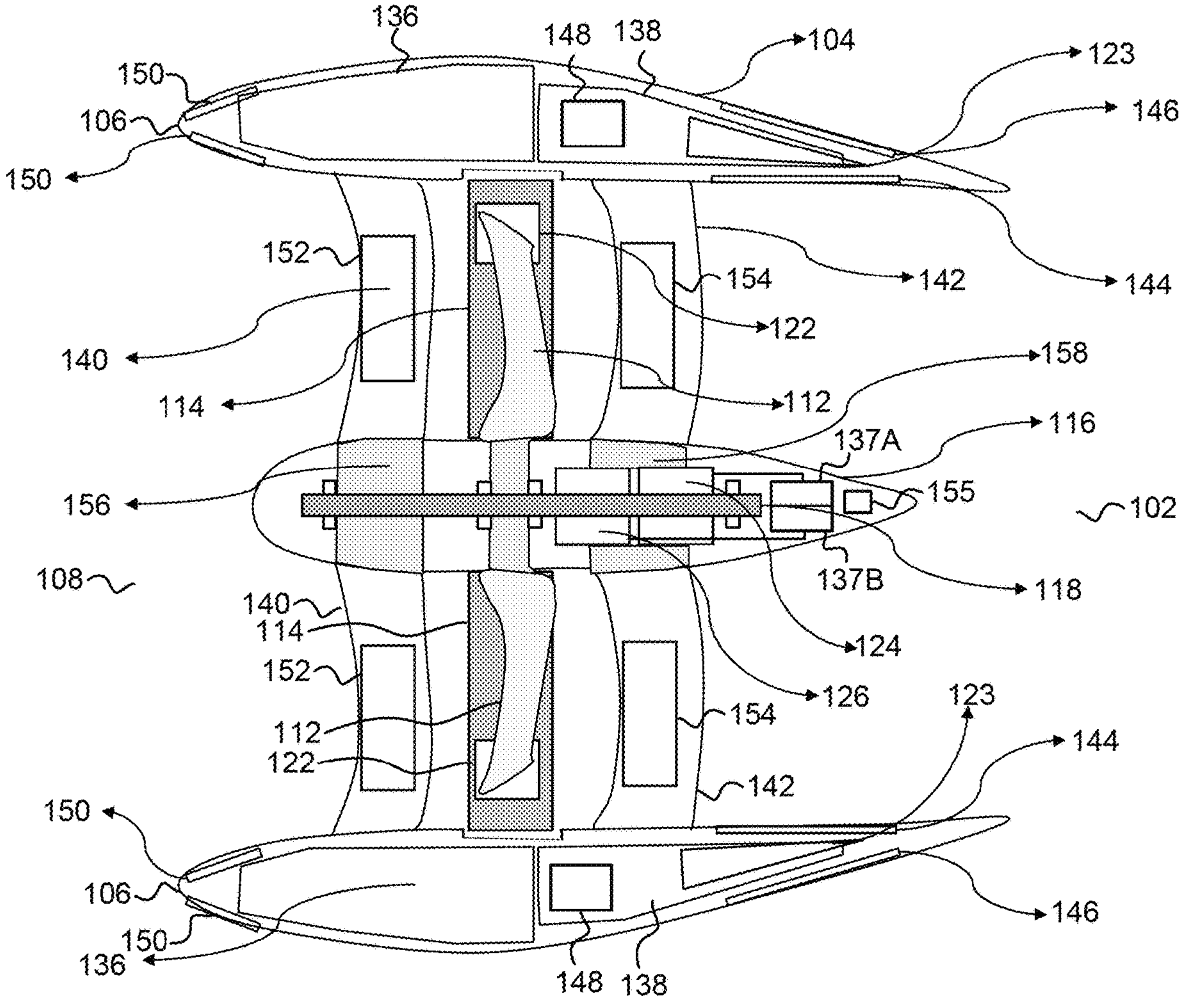
FIG. 4 shows an electric propulsion system according to a fourth example.

Referring to FIG. 4, there is shown a view 400 of an example of the electric propulsion system 102. Reference numerals common to FIG. 4 and any preceding figure refer to the same element.

The electric propulsion system 102 comprises first 124 and second 126 electric motors. The first and second 124 and 126 electric motors have respective first 137A and second 137B inverters. The motors 124 and 126 are axially aligned along the length of the central shaft 118. The motors 124 and 126 are operably independently of one another to drive the central shaft 118 and, in turn, drive the fan shroud 114. The motors 124 and 126 are also operable simultaneously.

As with the example describe above with reference to FIG. 3, the example electric propulsion system 102 can comprise the coolant flow 302 and return 304 and the coolant reservoir 306. Furthermore, the example electric propulsion system 102 have the one or more inverters 137A and 137B in the interior volume 106 of the nacelle 104 as opposed to the inverters 137A and 137B being positioned within the central hub 116.

Figure 5:
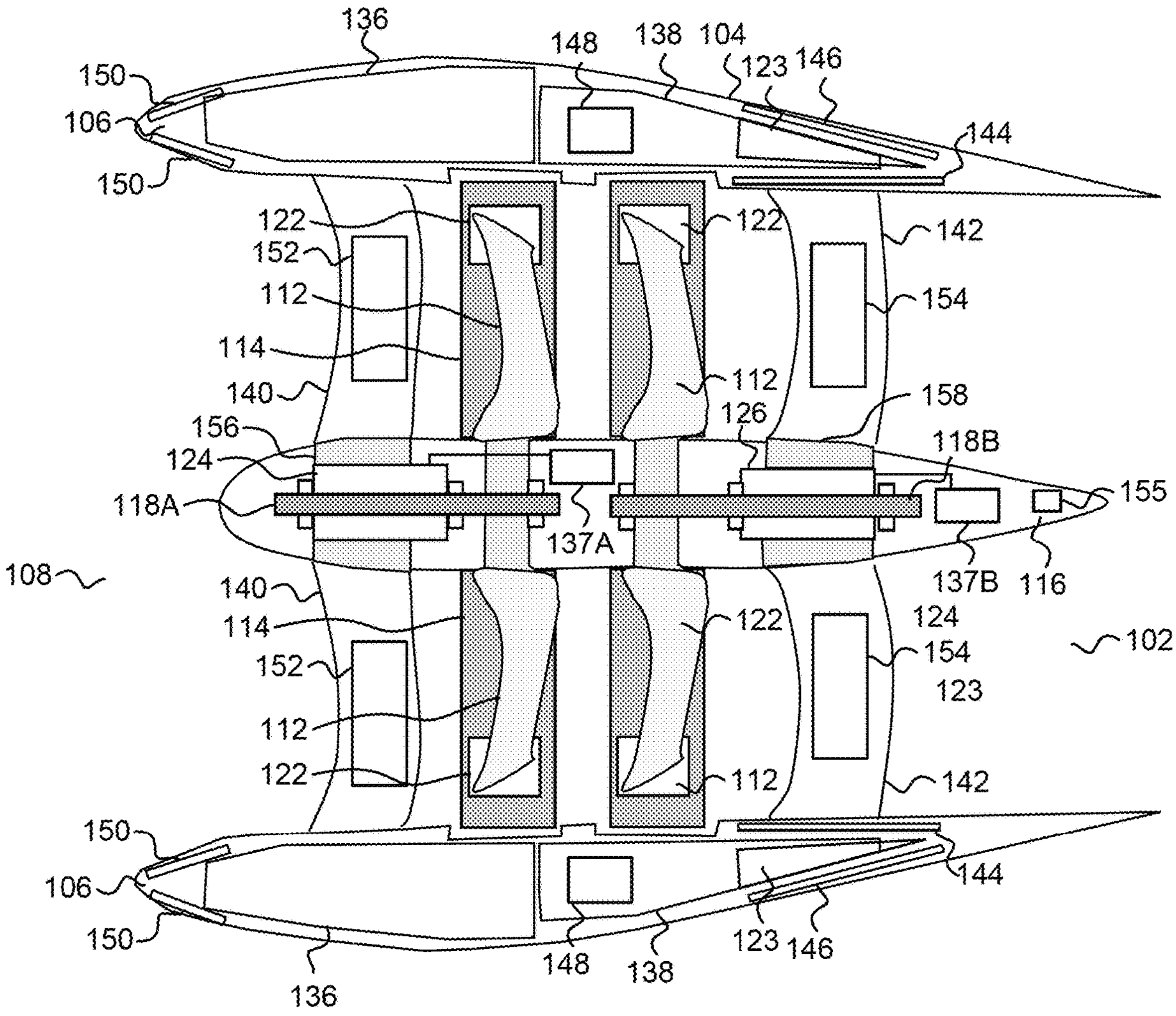
FIG. 5 illustrates an electric propulsion system according to a fifth example.

Referring to FIG. 5, there is shown a view 500 of example of the electric propulsion system 102. Reference numerals common to FIG. 5 and any of the preceding figures refer to the same elements.

The electric propulsion system 102 comprises first 124 and second 126 electric motors that are arranged to drive respective central shafts 118A and 118B housed within the central hub 116. The electric motors 124 and 126 are arranged to drive respective fan shrouds 114A and 114B in response to drive signals from respective inverters 137A and 137B.

Although the inverters are indicated as being housed within the central hub 116, examples are not limited thereto. Examples can be realised in which the inverters 137A and 137B are housed within the interior volume 106 of the nacelle 104.

The fan shrouds 114A and 114B can be driven to provide contra-rotating fans.

Figure 6:
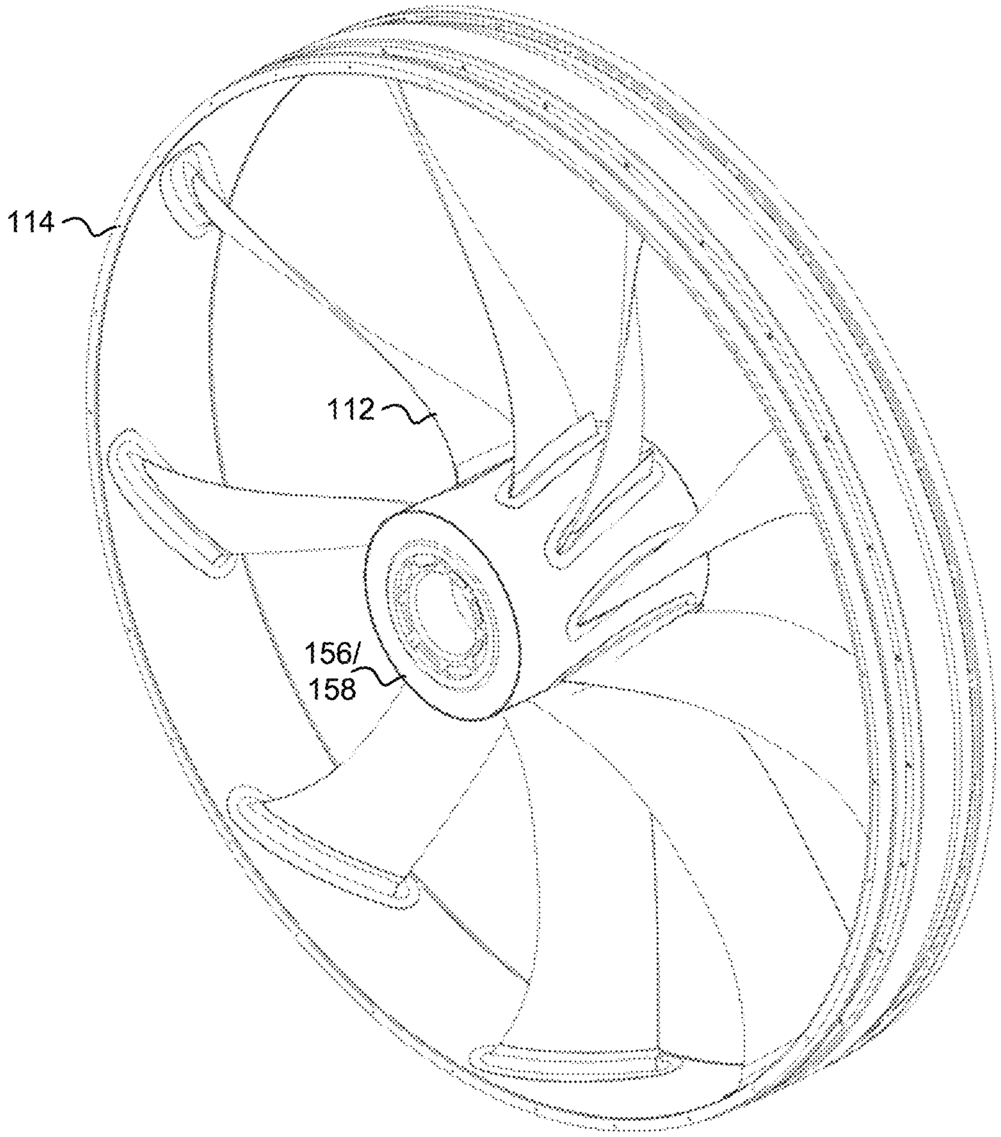
FIG. 6 depicts a fan shroud according to examples.

Referring to FIG. 6, there is shown a view 600 of the fan shroud 114 used in the examples described herein. The fan shroud 114 comprises a set of blades. In the example shown, the set of blades comprises nine blades 112. The blades 112 are anchored at respective blade roots to a central hub or boss 156, 158. The fan shroud 114 depicted in FIG. 6 I san example of any and all of the fan shrouds described and/or claimed herein.

Figure 7:
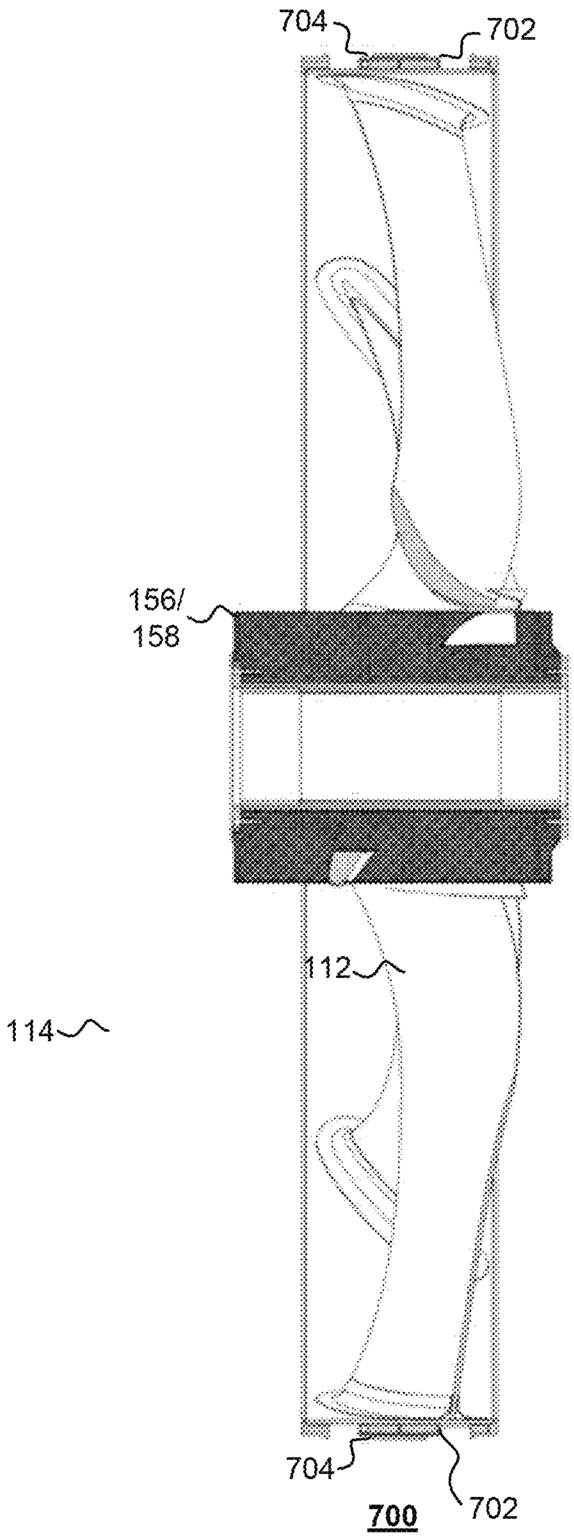
FIG. 7 shows a sectional view of the fan shroud of FIG. 6.

Referring to FIG. 7, there is shown a view 700 of a section through the fan shroud 114 depicted in FIG. 6. The shroud 114 has at least one set of the rotor magnets 702 disposed circumferentially around the outer surface 704 of the shroud 114. The example depicted in FIG. 7 has two sets 702 and

704 of such circumferentially disposed rotor magnets that cooperate with respective sets of stator magnets in a twin motor topology. The sets 702 and 704 of rotor magnets 702 are examples of the above described rotor magnets.

Figure 8:
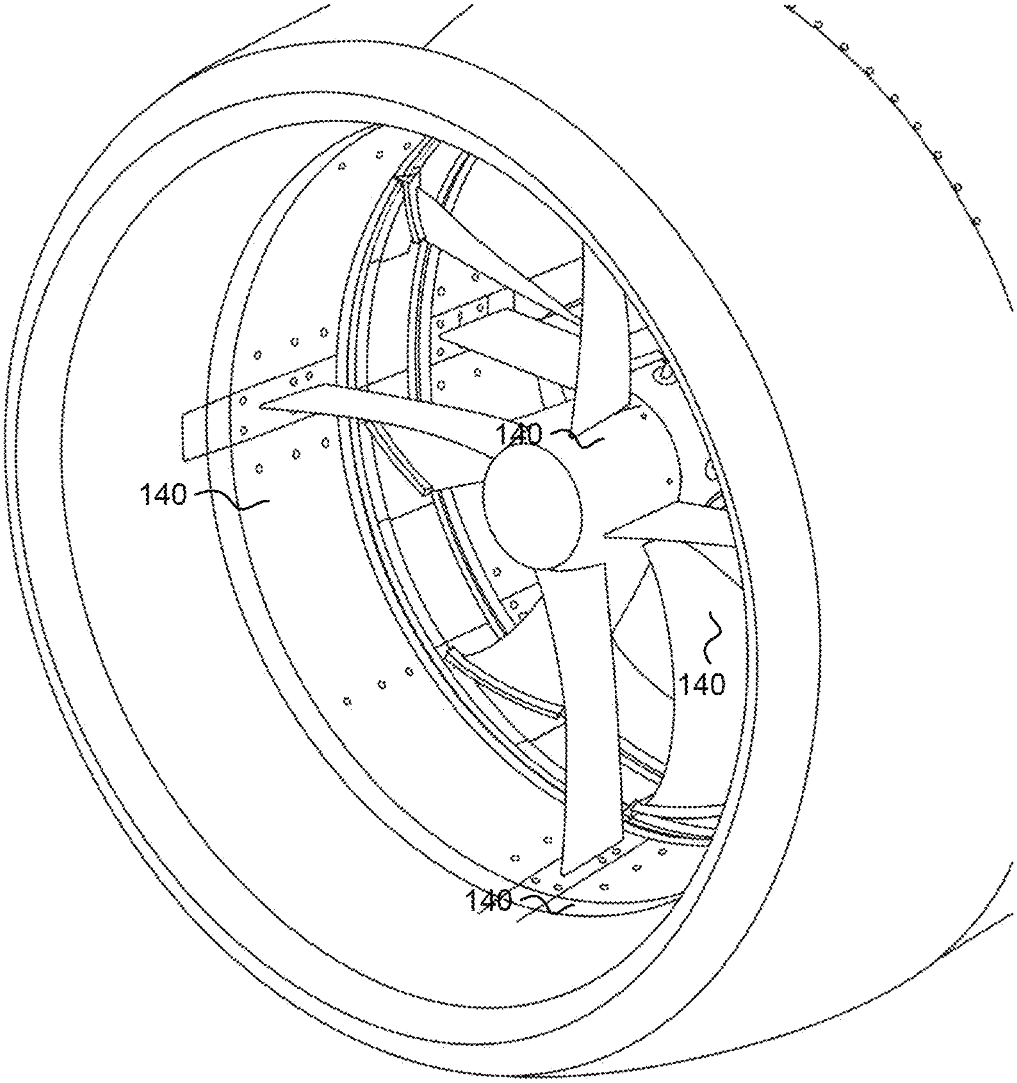
FIG. 8 illustrates inlet guide vanes according to examples.

Referring to FIG. 8, there is shown a view 800 of an electric propulsion system such as any of the systems described herein more clearly depicting the set of inlet guide vanes. In the example shown, the set of inlet guide vanes comprises four inlet guide vanes 140.

Figure 9:
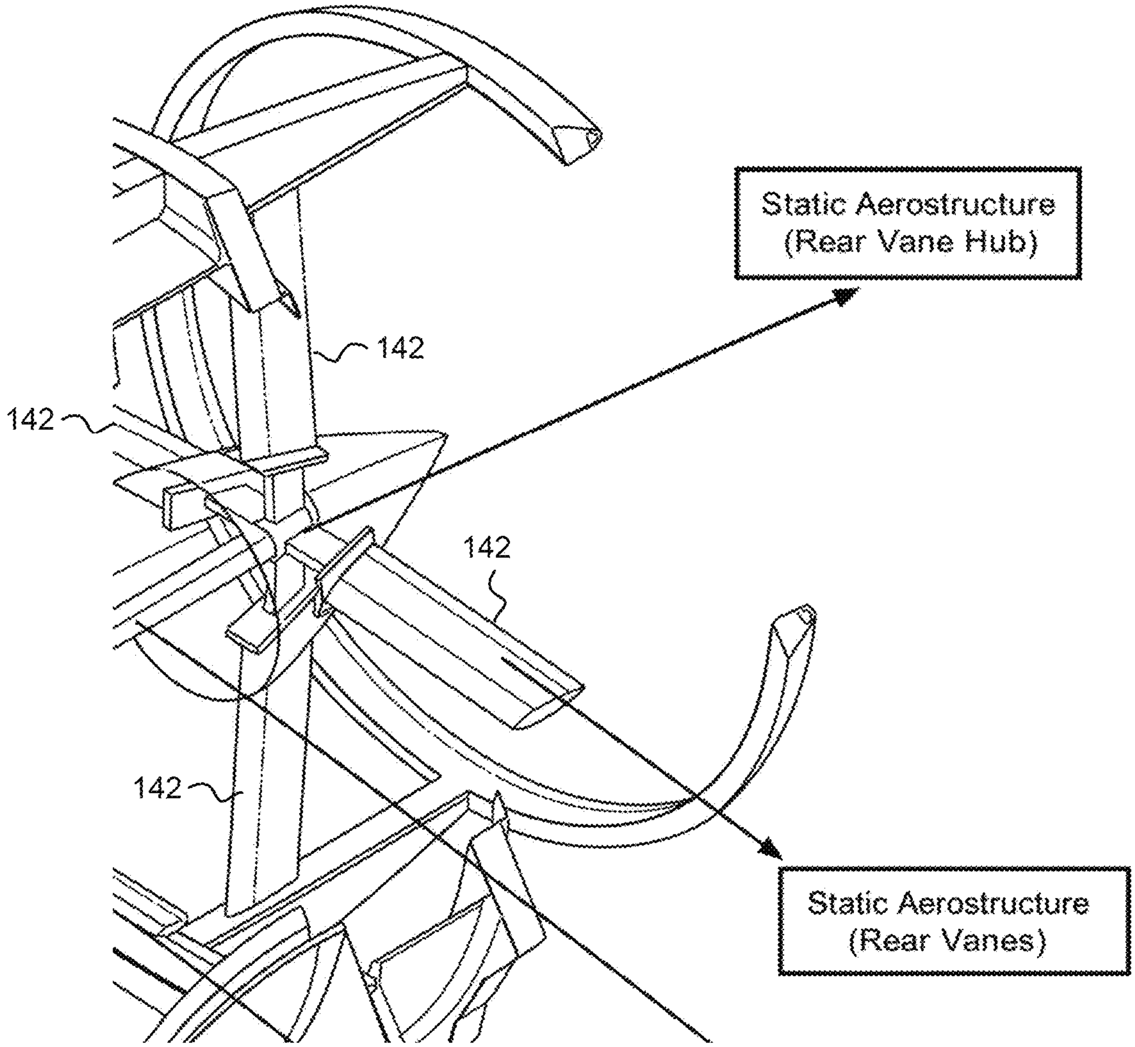
FIG. 9 depicts outlet guide vanes according to examples.

Referring to FIG. 9, there is shown a view 900 of an electric propulsion system such as any of the systems described herein more clearly depicting the set of outlet or exit guide vanes. In the example shown, the set of outlet or exit guide vanes comprises four outlet or exit guide vanes 140.

The electric propulsion systems can be used for all classes of aircraft and ground vehicles that use an electric motor(s) to drive aerodynamic surfaces that produce thrust, which includes all VTOL (vertical take-off and landing), CTOL (conventional take-off and landing), STOL (short take-off and landing), STOVL (short take-off and vertical landing) aircraft, hovercraft, airships, and transportation devices that produce thrust via an electric powertrain. The energy source on the aircraft might be maybe an electrochemical battery, hydrogen driving a fuel cell or internal combustion engine generator, any carbon fuel driving a generator (gas turbine/internal combustion engine) or any other source. Examples of such aircraft include Volocopter™, Ehang™, Lilium™, Airbus Vahana™, Bell Nexus™, Eviation Alice™. The use of an electric propulsion enables many novel vehicle configurations with unique advantages that are not possible with traditional powertrains such as gas turbines and internal combustion engines. At the same time, there are several challenges with these classes of vehicles, such as low energy density of certain electrical energy sources (e.g. electrochemical), heavy thermal management systems (low grade heat rejection), heavy cabling amongst others that are surmounted using the propulsion system according to the examples described herein.

Furthermore, many known electric powertrains for ducted propulsors for aircraft are distributed across the aircraft. The energy storage, typically a battery pack or fuel cell, is located in the fuselage or within the wing structures. Long cables then connect the battery packs to the inverters. The inverters, in turn, connect to the electric motor via cables and the motor then drives a propeller or a ducted fan to generate thrust. There are several inefficiencies these arrangement that are surmounted by the electric propulsion systems according to the examples described herein.

The weight of cabling can be between 1/10th and 1/5th the overall weight of the powertrain. Additionally, the cabling can cause up to 5-10% of overall power loss due to its internal resistance.

Still further, since each component of the powertrain is located independently of the other components, each requires its own housing structure, thermal management system and protection equipment. These can further increase overall powertrain weight to the point where the overall power density and energy density of the aircraft is very low. Again, the example electric propulsions systems described here surmount those technical challenges.

Additionally, the heat generated from each element of the powertrain, namely, any batteries, any motors, and inverters, is usually wasted into the ambient air. This loss can be up to 10-15% of overall power and can significantly affect overall powertrain performance. Again, the example electric propulsion systems described herein surmount that technical problem by harvesting heat from the powertrain to perform useful functions such as, for example, de-icing or increasing thrust.

All of the above problems result in low aircraft range and endurance. In a few electric aircraft classes such as eVTOLs, there is not enough power/energy available to get the aircraft of the ground when the requirement for reserve power is also considered.

The examples described herein can be realised so that an entire powertrain is embedded within a single unit, or are positioned close to one another, the cabling is reduced compared to a powertrain comprising more distributed components. Furthermore, the close proximity of the components of the powertrain allow at least one of: the mechanical housing, thermal management systems and protection equipment, taken jointly and severally in any and all permutations, to be shared, which leads to an overall weight reduction.

Example that use a battery or battery pack are the electrical energy source provide high power density (W/m3) but at low specific energy (J/kg) and energy density (W/m3). Since the battery or batter pack is located inside the inner volume 106 of the nacelle 104 itself, instead of a central fuselage, provides an aircraft level advantage and a safety advantage over systems where the energy source is located in the fuselage. The central fuselage space is freed up for at least one, or both, of more payload and fuel cell powertrains within the fuselage. Fuel cells powertrains offer high specific energy (J/kg) but at a low energy density (J/m3) and power density (W/m3). When both batteries and fuel cells are used together, they are competing for space in the fuselage volume, which leads to a compromised solution. By placing the battery packs in the electric propulsion system (away from the fuselage), and the fuel cell powertrains in the fuselage, the aircraft can take advantage of having both sources of energy and power achieving a higher overall power density and specific energy than a traditional powertrain where only one of the two energy sources are chosen. The safety advantage is that all of the battery packs are not located in one central location on the aircraft close to the passengers/cargo, rather they are distributed in respective electric propulsion systems around the aircraft. In case of a single failure of a pack, the damage cannot propagate to all other battery packs.

Any and all examples can be realised in which the at least one fan stage comprising a fan bearing a plurality of aerodynamic surfaces/blades to generate thrust comprises a single such fan stage bearing a plurality of aerodynamic surfaces/blades to generate thrust.

Using ducted fans is more efficient than open propellers of the same diameter at low speeds (typical of electric aircraft) due to thrust generation from the duct itself. Further, the duct of the examples described herein, in addition to producing thrust, acts as a structural housing for the powertrain including the heat exchangers. The duct also acts as a safety shroud that protects the aircraft and payload in case of blade failure.

The examples described herein find particular application in electric propulsion systems that have a particular range of hub to tip ratios. The example electric propulsion systems described herein have a range of hub to top ratios of 0.2 to 0.3.

In any and all examples described and/or claims herein, the combination of having an electrical power source in the inner volume of the nacelle, a motor in the central hub, a shrouded fan and a hub-to-tip ratio of between 0.1 to 0.4, preferably, 0.2 to 0.3, allows electric propulsion systems to be realised that have favourable performance across a range of parameters such as, for example, at least one, or both, of acoustic noise and high propulsion efficiency.

When integrating the powertrain into the duct, an approach would be to also locate the electric motor drive in the rim to realise the benefits of integrating at least one, or both, of any electric motors and inverters within the duct too so that those other aspects are close to the other aspects of the power train such as, for example, one or more than one of the following taken jointly and severally in any and all permutations: energy storage, thermal management systems and power management systems. A further motivation to use rim driven motors is that they provide gear free torque merging from multiple powertrains into a single stage. However, examples can be realised in which the at least one or more than one electric motor is incorporated into a central hub while other elements of the power train are housed within the duct, that is, within the internal volume of the nacelle, which can be advantageous in certain conditions, such as, for example, when at least one or more of the following, taken jointly and severally in any and all permutations, are required or realised: when more battery capacity needs to be integrated into the duct, when one or more than one fuel cell needs to be integrated into the duct or the power required from the one or more than one electric motor is small enough for the electric motor to be positioned inside the central hub while maintaining a hub-to-tip ratio of 0.2-0.3. Having the one or more than one electric motor in the hub is advantageous since reductions can be realised in terms of weight and drag penalties associates with at least one, or both of, a longer or thicker duct, that is, an increased diameter that increases the wetted area and drag. The foregoing is contrary to conventional approaches, since in 'low power' situations with electric motors for a given size of a ducted fan with an inner diameter, outer diameter and hub-to-tip ratio, an electric motor can sit in various locations to drive the fan stage. For example, referring to FIG. 1, for a given size of a ducted fan, which can be set by dimensional constrains on an aircraft, to increase or improve aerodynamic efficiency, for example, balance is chosen between contributions to thrust from the fan blades versus cross-sectional area of air-flow through the duct versus motor size, and, hence, central hub size. For instance, examples can be realised that have a hub-to-tip ratio of 0.1-0.4, or, preferably. 0.2-0.3. Therefore, for a fixed nacelle size, if a certain thrust is sought, the associated power requirements from the electric motor or electric motors can be determined. If the thrust levels and power levels are low enough such that an electric motor can be sized to fit within the ideal hub-to-tip ratio of 0.2-0.3 then, for a given duct size, the electric motor or motors might be positioned in the central hub as shown by reference 124 in FIG. 1. As the thrust and power requirement grows, the electric motor or electric motors get bigger that, in turn, requires more ancillaries for thermal management, for instance, which begins to require a larger hub-to-tip ratio of greater than 0.3 or greater than 0.4. The foregoing, at that transition point, presents significant challenges in the design of the electric ducted fan. Firstly, the higher hub-to-tip ratio mean that less area is available for air to pass through the duct, which increases the power requirement further as the reduced air has to be accelerated to high speeds to produce the same thrust. Secondly, it becomes increasingly challenging to remove heat from the electric motor 124 through air cooling alone and liquid cooling becomes essential. If, at this transition point or stage, a rim-driven motor is employed, the increased volume available in the duct can be used for the higher power requirement and the central hub can be reduced to the original hub-to-tip ratio of 0.2-0.3 for better aero-efficiency or examples can use a hub-less arrangement with a suitable rim bearing.

Additionally, when at least one or more than one electric motor is located in the central hub, a fan stage is, or fan stages are, driven from the fan blade root at the hub as opposed to the fan blade tip near the duct as with rim driven arrangements. With rim driven systems, the shroud of the shrouded fan blades is used to support the weight of the permanent magnet rotor elements. However, when driven from the hub, there is no longer a need to provide a shrouded fan blade because the permanent magnet rotor elements are supported at the fan blade root rather than the tip. Accordingly, central hub based electric motors use open tip unshrouded fan blades. Using a shroud comprising shrouded fan blades has one or more than one key advantage such as at least one or more of the following, taken jointly and severally in any and all permutations: better control of tip leakage that otherwise cause noise and efficiency losses, lower tip degradation problems and better fan blade retention leading to safer operations. The addition of the shroud is counter intuitive since it comes at the price of increased weight. However, the increased weight is offset by appropriate design of the fan blade and shroud composite structure. A schematic of the shrouded fan blades is shown in FIGS. 6 and 7.

Accordingly, examples provide an electric propulsion system; the system comprising

- a. a nacelle comprising an aerodynamic annular housing defining an internal annular volume and defining an inner duct,
- b. at least one fan stage comprising a fan bearing a plurality of aerodynamic surfaces/blades to generate thrust mounted within a fan shroud, and
- c. a powertrain comprising at least one electric motor to drive the fan shroud and at least one electrical power source to power the electric motor; and
- d, wherein
- i. the fan shroud is disposed within the inner duct,
- ii. at least part of the powertrain is disposed within the internal annular volume,
- iii. the at least one electric motor is disposed within the central hub, and
- iv. the hub-to-tip ratio is between 0.1 and 0.4, preferably, between 0.2 and 0.3.

Examples can be realised according to the following clauses:

The invention claimed is:

1. An electric propulsion system; the system comprising a. a nacelle comprising an aerodynamic annular housing defining an internal annular volume and defining an inner duct, b. at least one fan stage comprising a fan shroud to generate thrust, the fan shroud bearing a plurality of aerodynamic surfaces/blades mounted between an outer annulus and a central fan hub, and c. a powertrain comprising at least one electric motor to drive the fan shroud and at least one electrical power source to power the electric motor; and d. wherein i. the fan shroud is disposed within the inner-duct, ii. at least part of the powertrain is disposed within the internal annular volume, iii. the at least one electric motor is disposed within a central hub and iv. the fan shroud comprises a hub radius R_hub, where R_hub is a radius of the central fan hub and a tip radius R_tip, where R_tip is a radius of the fan shroud from a centerline to a distal end of an aerodynamic surface/blade of the plurality of aerodynamic surfaces/blades, wherein a hub-to-tip ratio, R_hub/R_tip, is between 0.1 and 0.4.

2. The electric propulsion system of claim 1, in which the powertrain comprises one or more than one or more than one of: an engine control unit, at least one inverter, or a power distribution system.

3. The electric propulsion system of claim 1, in which the at least one electrical power source comprises an energy storage system.

4. The electric propulsion system of claim 3, in which the energy storage system comprises at least one battery.

5. The electric propulsion system of claim 4, in which the at least one battery comprises at least a partially toroidal form factor adapted to fit within the internal annular volume of the nacelle.

6. The electric propulsion system of claim 1, in which the at least one electrical power source comprises a fuel cell to generate electrical power to power the at least one electric motor.

7. The electric propulsion system of claim 1, comprising a thermal management system disposed within the internal annular volume of the nacelle.

8. The electric propulsion system of claim 7, in which the thermal management system comprises a heat collection system carrying a heat absorbing medium.

9. The electric propulsion system of claim 8, in which the heat absorbing medium comprises a dielectric liquid.

10. The electric propulsion system of claim 9, in which the heat collection system comprises a network carrying the heat absorbing medium; the network being common to multiple heat generating elements of powertrain.

11. The electric propulsion system of claim 7, in which thermal management system comprises a heat redistribution network; the heat redistribution network being arranged to redistribute heat generated by the powertrain to selectable portions of the electric propulsion system.

12. The electric propulsion system of claim 11, in which the heat redistribution network is arranged to redistribute heat generated by the powertrain to a heat exchanger arranged to vent heat into an aft portion of the inner duct for heating air within the inner duct.

13. The electric propulsion system of claim 12, in which the heat exchanger comprises a profiled surface adapted to radiate the heat into the inner duct.

14. The electric propulsion system of claim 13, in which the heat redistribution network is arranged to redistribute heat generated by the powertrain to at least one, or more than one, of: a leading edge of a fore portion of the nacelle or, a leading edge of the plurality of aerodynamic surfaces.

15. The electrical propulsion system of claim 1, comprising at least two fan stages each comprising a respective fan shroud to generate thrust; said respective fan shroud bearing a plurality of aerodynamic surfaces/blades between an outer annulus and a central fan hub and in which the at least one electric motor comprises at least two central hub mounted electric motors arranged to drive said respective fan shrouds.

16. The electric propulsion system of claim 15, in which each motor of the at least two central hub mounted electric motors are operable at least one, or both, of: independently and simultaneously.

17. The electric propulsion system of claim 1, in which the at least one electric motor is arranged to drive the at least one fan stage at above a threshold revolutions per minute, RPM.

18. The electric propulsion system of claim 17, in which the threshold RPM is 2000 RPM.

19. The electric propulsion system of claim 1, in which the or any fan shroud is arranged to influence at least one, or both, of: air flow associated with radially extremities of the aerodynamic surface/blades of the fan or noise generated by radially extremities of the aerodynamic surface/blades of the fan.

20. The electric propulsion system of claim 19, in which the or any fan shroud comprises a plurality of fixtures for mounting the aerodynamic surfaces/blades to the fan shroud.

21. The electric propulsion system of claim 1, in which the at least one fan stage is rotatably mounted for rotation on the central hub.

22. The electric propulsion system of claim 21, comprising a plurality of load transfer members to couple load generated in response to the thrust to load bearing members for coupling to an aircraft.

23. The electric propulsion system of claim 22, in which the plurality of load transfer members comprises a set of inlet guide vanes shaped to influence airflow into the fan stage.

24. The electric propulsion system of claim 22, in which the plurality of load transfer members comprises a set of exit guide vanes shaped to influence airflow through an aft portion of the nacelle.

25. The electric propulsion system of claim 21, in which the central hub comprises a bearing system for carrying the at least one fan stage; the bearing system being rotatable about a central axially disposed shaft.

26. The electric propulsion system of claim 1, in which the nacelle comprises three sections comprising a fore section, and aft section and a middle section; the fore section comprising a leading edge of the nacelle, middle section bearing the at least one fan stage and the aft section comprising a trailing edge or exhaust section of the nacelle.

* * * * *